(12) United States Patent
Devost

(10) Patent No.: US 9,117,076 B2
(45) Date of Patent: Aug. 25, 2015

(54) SYSTEM AND METHOD FOR DETECTING POTENTIAL THREATS BY MONITORING USER AND SYSTEM BEHAVIOR ASSOCIATED WITH COMPUTER AND NETWORK ACTIVITY

(71) Applicant: Matthew G. Devost, Ashburn, VA (US)

(72) Inventor: Matthew G. Devost, Ashburn, VA (US)

(73) Assignee: Wintermute, LLC, Ashburn, VA (US)

( * ) Notice: Subject to any disclaimer, the term of this patent is extended or adjusted under 35 U.S.C. 154(b) by 21 days.

(21) Appl. No.: 13/829,613

(22) Filed: Mar. 14, 2013

(65) Prior Publication Data

US 2013/0254885 A1 Sep. 26, 2013

Related U.S. Application Data

(60) Provisional application No. 61/610,699, filed on Mar. 14, 2012.

(51) Int. Cl.
*G06F 21/56* (2013.01)
*G06F 21/31* (2013.01)

(52) U.S. Cl.
CPC .............. *G06F 21/56* (2013.01); *G06F 21/316* (2013.01)

(58) Field of Classification Search
CPC ..................................................... G06F 21/554
USPC ............................................................. 726/23
See application file for complete search history.

(56) References Cited

U.S. PATENT DOCUMENTS

| 8,032,489 B2 | 10/2011 | Villella et al. |
| 8,327,441 B2 | 12/2012 | Kumar et al. |
| 2011/0179488 A1* | 7/2011 | Mankins .......................... 726/23 |
| 2012/0005542 A1 | 1/2012 | Petersen et al. |
| 2012/0131185 A1 | 5/2012 | Petersen et al. |

* cited by examiner

*Primary Examiner* — Jacob Lipman
(74) *Attorney, Agent, or Firm* — Rene A. Vazquez, Esq.

(57) ABSTRACT

A system and method is provided to monitor user and system behavior associated with computer and network activity to determine deviations from normal behavior that represent a potential cyber threat or cyber malicious activity. The system and method uses a multi-factor behavioral and activity analysis approach to determine when a trusted insider might be exhibiting threatening behavior or when a user's computer or network credentials have been compromised and are in use by a third-party. As a result, changes in insider behavior that could be indicative of malicious intent can be detected, or an external entity masquerading as a legitimate user can be detected.

18 Claims, 3 Drawing Sheets

SYSTEM AND METHOD FOR DETECTING POTENTIAL THREATS BY MONITORING USER AND SYSTEM BEHAVIOR ASSOCIATED WITH COMPUTER AND NETWORK ACTIVITY

This application claims priority to U.S. Provisional Application Ser. No. 61/610,699 filed Mar. 14, 2012, whose entire disclosure is incorporated herein by reference.

BACKGROUND OF THE INVENTION

1. Field of the Invention

The present invention relates to the detection of potential threats to computer systems and networks and, more specifically, to the non-invasive interrogation of computer and network system resources to identify potentially threatening behavior by users.

2. Background of the Related Art

Cyber security threats aimed at corporations and government organizations are becoming more sophisticated. It is expected that the sophistication, complexity and targeted nature of cyber attacks will continue to grow. It has been estimated that there has been a three-fold increase in threats that are customized for their target, and a five-fold increase in attacks against the U.S. government from 2006 to 2009.

Once a threat has penetrated the network perimeter, or if the threat originates from inside the organization, one must try to identify the threat based by analyzing the network and users' systems for clues. There are approaches to that analyze the hygiene or health of a user's system to determine the security risk. However, a malicious insider will always make sure that their system's health will pass scrutiny. Further, system health is a factor that is easily spoofed by an external attacker as well.

SUMMARY OF THE INVENTION

An object of the invention is to solve at least the above problems and/or disadvantages and to provide at least the advantages described hereinafter.

Therefore, an object of the present invention is to provide a system and method for monitoring user and system behavior associated with computer network activity.

Another object of the present invention is to provide a system and method for determining when user or system behavior associated with computer network activity deviates from normal behavior.

Another object of the present invention is to provide a system and method for identifying a potential cyber threat or malicious cyber activity.

Another object of the present invention is to provide a system and method for identifying a potential cyber threat or malicious cyber activity based on system-based indicators and user-based behavioral indicators.

Another object of the present invention is to provide a system and method for creating a reference data map that defines a normal pattern of system and user behavior based on predetermined factors.

Another object of the present invention is to provide a system and method for creating a reference data map that defines a normal pattern of system and user behavior based on data gathered from users that are assigned a common predefined role in an organization.

Another object of the present invention is to provide a system and method for creating a reference data map that defines a normal pattern of system and user behavior based on data gathered from all users in an organization.

Another object of the present invention is to provide a system and method for creating a reference data map that defines a normal pattern of system and user behavior based on data gathered from users in multiple organizations.

Another object of the present invention is to provide a system and method for creating a host data map that is indicative of the state and behavior of a host system.

Another object of the present invention is to provide a system and method for identifying a potential cyber threat or malicious cyber activity based on differences between a reference data map and a host data map.

To achieve at least the above objects, in whole or in part, there is provided a method for monitoring a data network and identifying potentially malicious or threatening cyber activity, comprising monitoring and collecting digital hidrosis data from at least one host system, wherein the digital hidrosis data comprises data associated with predetermined system behavioral factors, comparing the digital hidrosis data with reference digital hidrosis data, wherein the reference digital hidrosis data defines normal values and/or a normal range of values for the predetermined system behavioral factors and determining whether malicious or threatening cyber activity may be present based on the comparison between the digital hidrosis data and the reference digital hidrosis data.

To achieve at least the above objects, in whole or in part, there is also provided a system for monitoring a data network and identifying potentially malicious or threatening cyber activity, comprising at least one host system, wherein each host system comprises a host processor and host memory, and a digital hidrosis monitor comprising a set of computer readable instructions stored in each host memory that are executable by each host processor to: monitor and collect digital hidrosis data from the host system, wherein the digital hidrosis data comprises data associated with predetermined system behavioral factors, compare the digital hidrosis data with reference digital hidrosis data stored in the memory, wherein the reference digital hidrosis data defines normal values and/or a normal range of values for the predetermined system behavioral factors, and determine whether malicious or threatening cyber activity may be present based on the comparison between the digital hidrosis data and the reference digital hidrosis data.

To achieve at least the above objects, in whole or in part, there is also provided a system for monitoring a data network and identifying potentially malicious or threatening cyber activity, comprising at least one digital hidrosis monitor, wherein each digital hidrosis monitor: monitors and collects digital hidrosis data from a respective host system, wherein the digital hidrosis data comprises data associated with predetermined system behavioral factors, compares the digital hidrosis data with reference digital hidrosis data, wherein the reference digital hidrosis data defines normal values and/or a normal range of values for the predetermined system behavioral factors, and determines whether malicious or threatening cyber activity may be present based on the comparison between the digital hidrosis data and the reference digital hidrosis data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
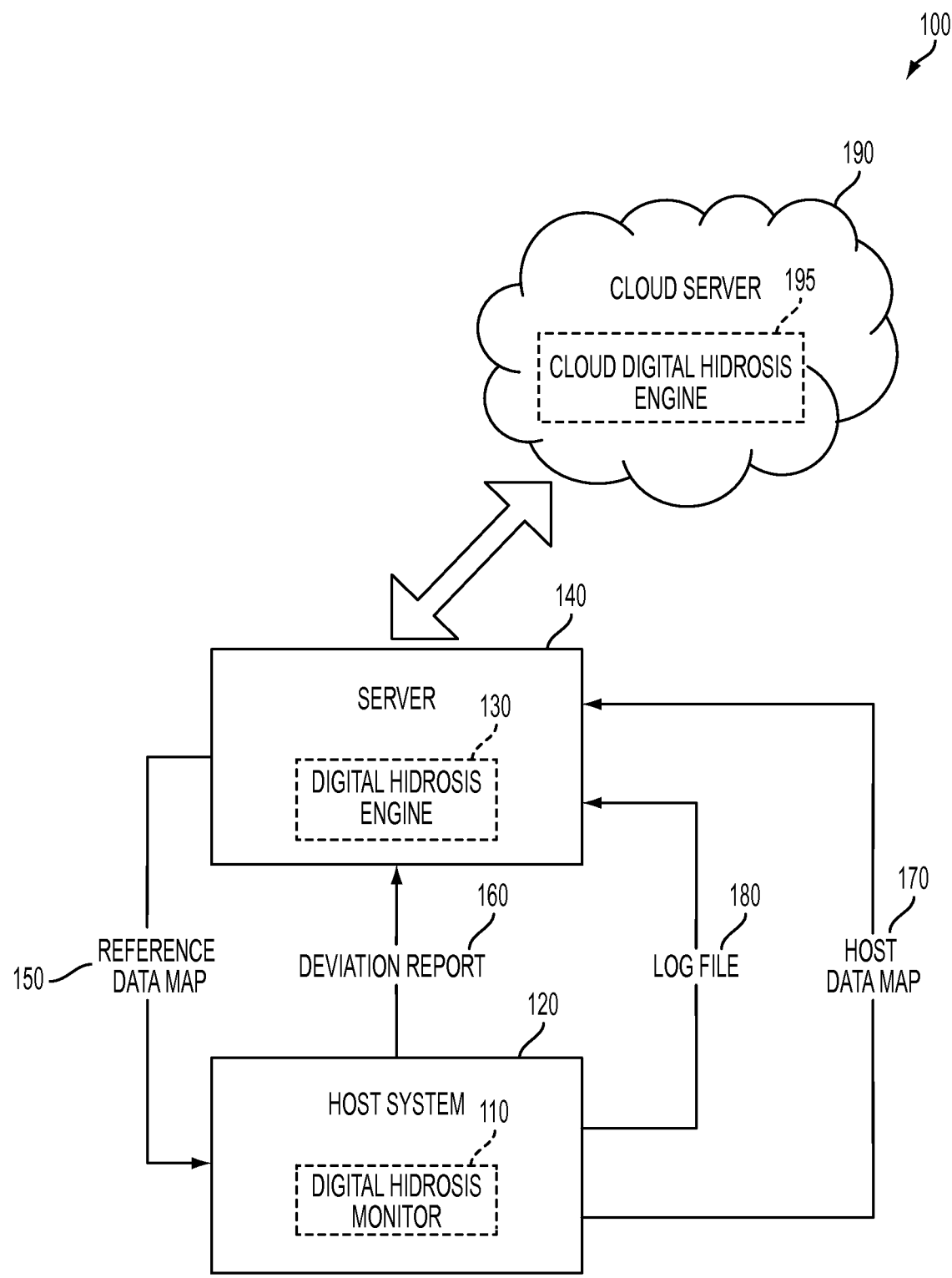
FIG. 1 is a block diagram that illustrates the major components of a digital hidrosis system 100, in accordance with one preferred embodiment of the present invention.

The present invention provides an approach to monitoring user and system behavior associated with computer and network activity to determine deviations from the norm that represent a potential cyber threat or cyber malicious activity. This approach is herein referred to as "digital hidrosis."

Digital hidrosis uses a multi-factor behavioral and activity analysis approach to determine when a trusted insider might be exhibiting threatening behavior or when the users computer or network credentials have been compromised and are in use by a third-party. As a result, it is able to detect changes in insider behavior that could be indicative of malicious intent, or an external entity masquerading as a legitimate user.

The foundation of the approach is inspired by the traditional law enforcement method of profiling based on abnormal system behavior in persons subject to non-intrusive interrogation at checkpoints or border crossings. Within this profiling discipline, law enforcement personnel look for indicators that the "system" (in this case the human body) exhibits anomalous behavior patterns such as excessive sweating or sweaty palms, body tension, or glaze diversion.

Digital hidrosis engages in non-intrusive interrogation of computer and network behavior to establish patterns of normality not only on a per-user basis, but also across different classes of users or user roles (e.g. accounting, administration, sales, etc.), and then looks for subtle indicators or anomalies that could be indicative of an increased risk. The normalization process and anomaly detection is conducted via known pattern recognition and machine learning techniques based on the identified Digital hidrosis factors analyzed at the system and network level.

This behavior is then flagged and processed to create a subject-based investigation to determine whether the behavior is indicative of an existing or emerging threat to system and network resources. Digital hidrosis behavioral indicators can be adjusted in real-time to develop a specific risk profile or to reduce false positives during events that impact multiple users (e.g., a global tragedy results in increased personal web browsing for news stories).

There are some approaches to information security that analyze the hygiene or health of a user system to determine the security risk. Unfortunately, a malicious insider's hygiene or system health will always pass scrutiny and system health is a factor easily spoofed by an external attacker.

Digital hidrosis is unique in that the system behavior factors that are examined to determine if an anomaly exists are based on a combination of system and user-based indicators. These indicators are not readily observable or understood by a user and cannot be spoofed by an outside attacker. In this sense, the system betrays a change in intent in the same way the body can betray intent through hyperhidrosis (abnormal sweating). Digital hidrosis can also be implemented at both the network and host level, either individually or in tandem.

FIG. 1 is a block diagram that illustrates the major components of a digital hidrosis system 100, in accordance with one preferred embodiment of the present invention. The system 100 includes a digital hidrosis monitor 110 that preferably runs on a host system 120, and a digital hidrosis engine 130 that preferably runs on a server 140.

The digital hidrosis engine 130 and digital hidrosis monitor 110 are preferably each implemented with one or more programs or applications run by the server 140 and host system 120, respectively. The programs or applications that implement the digital hidrosis engine 130 and digital hidrosis monitor 110 are respective sets of computer readable instructions that are stored in respective memory on the server 140 and host system 120, respectively. The server 140 and host system 120 are connected to a network through which they communicate with each other and with other devices on the network. The server 140 is suitably any type of server, such as a Windows server, Linux server, Unix server or the like. The host system 120 is typically a computer that can be connected to a network. However, the server 140 and host system 120 can each be implemented with any type of processing device that can be connected to a network, such as a general purpose desktop computer, general purpose laptop computer, a special purpose computer, a tablet computer, or a smartphone. In general, any device on which a finite state machine capable of running the software used to implement the digital hidrosis monitor and the digital hidrosis engine 130 can be used as the server 140 or host system 120.

The network to which the server 140 and host system 120 are connected can be a wired or wireless network, and may include or interface to any one or more of for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34b is analog modem connection, a cable modem, an ATM (Asynchronous Transfer Mode) connection, an FDDI (Fiber Distributed Data Interface) or CDDI (Copper Distributed Data Interface) connection.

The network may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link, such as a cellular phone channel, a GPS (Global Positioning System) link, CDPD (Cellular Digital Packet Data), a RIM (Research in Motion, Limited) duplex paging type device, a Bluetooth radio link, an IEEE standards-based radio frequency link (WiFi), or any other type of radio frequency link. The network may yet further be, include or interface to any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The digital hidrosis monitor 110 on the host system 120 monitors and collects host digital hidrosis data (HDHD). The term "digital hidrosis data" refers to data that is associated with predetermined digital hidrosis factors. The predetermined digital hidrosis factors preferably include the following:

Application Anomaly—an anomalous or unknown code gains execution privileges. Persistent unauthorized access to resources can not be achieved without some level of execution on the host system 120.

Average CPU Utilization—CPU utilization in the host system 120 is outside a determined normal range, indicating the presence of background tasks or applications or CPU intensive activity such as password cracking.

Application Activity—an application on the host system 120 is exhibiting activity that is unusual for the user of the host system 120. For example, a user has never utilized a command prompt or system shell in the past, but now that application or window is open and in use.

External Connectivity Timing—the timing of external connections deviates from normal. For example, a user of the host system 120 typically initiates external connections at random intervals, but now connections are taking place within specific or patterned increments.

User Interface Lag—performance of mouse or other input technologies lags behind a normal range. This can be indicative of remote control software in use.

Session Length—system session or VPN activity or other network session is outside a normal range.

Network Activity—this factor can include complex variables such as, for example, the user usually visits ESPN.go.com several times during the work day and has not recently, or the user typically conducts a certain number system or network search queries per hour and is now conducting a significantly higher number of queries per hour. Another example would be excessive queries outside an assigned AOR or bandwidth used for non-typical (or outside business rule) usage. This factor preferably includes information about total network activity (volume of network throughput, volume to external systems, volume to internal systems) and time based frequency counts of network destinations (e.g., visits Facebook 12 times per day/50% of which are between the hours of 11:00 a.m.-1:00 p.m.).

System Settings—the system settings do not match what an authenticated user typically sets. For example, an authenticated user typically has the system time zone set to EST and it is now set to PST.

Hygiene—hygiene-based interrogation factors can be incorporated as appropriate such as, for example, the presence of antivirus updates, etc.

Data Acquisition Habits—user access to internal data sources either stored locally or accessible via network attached storage of any variety or accessible via network-based protocols, such as http, ftp, etc.

In operation, the digital hidrosis monitor 120 collects HDHD and, optionally, parameters associated with traditional network activity logs ("activity log parameters"). The activity log parameters preferably include, but are not limited to:

Web sites visited by the user;
Network connections initiated; and
Application activity: (i) application executed; (ii) application MD5 hash; (iii) duration of application execution; and (iv) application network activity.

The digital hidrosis monitor 120 then compares the HDHD to reference digital hidrosis data (RDHD) sent by the server 140, and optionally compares activity log parameters (ALP) to reference activity log parameters (RALP) sent by the server 140. The RDHD and RALP are sent by the server 140 as a reference data map 150.

The RDHD define values and/or a range of values for the digital hidrosis factors that represent normal behavior or activity. Likewise, RALP define values and/or a range of values for the activity log parameters that represent normal behavior or activity.

The host systems 120 are initially provided with RDHD and RALP based on historical digital hidrosis data and activity log parameters collected and normalized by the digital hidrosis engine 130. If no historical data is available, an administrator can provide initial baseline values for the RDHD and RALP.

If a deviation from the RDHD and, optionally, a deviation from the RALP is detected, the digital hidrosis monitor 110 sends a deviation report 160 to the digital hidrosis engine 130 on the server 140. The amount of deviation from the RDHD and/or the RALP that is required to trigger sending a deviation report 160 to the digital hidrosis engine 130 can be set by an administrator. For example, an administrator can set up predetermined deviation thresholds for each digital hidrosis factor and/or each activity log parameter that would trigger a deviation report 160. Such deviation thresholds can vary based on the number and combinations of digital hidrosis factors and/or activity log parameters that have deviated from a normal range.

For example, the administrator could set up the digital hidrosis monitor 110 to send a deviation report 160 whenever an application anomaly is detected, regardless if any other digital hidrosis factors or activity log parameters deviate from the normal range. Likewise, the administrator may set up the digital hidrosis monitor 110 to send a deviation report 160 when average CPU utilization exceeds a predetermined level combined with an interface lag that exceeds a predetermined level. As another example, the administrator may set up the digital hidrosis monitor 110 to send a deviation report 160 when a session length exceeds a predetermined level combined with a web site that is visited that is not one of the web sites typically visited by that user.

In general, the administrator can define a triggering event for a deviation report 160 based on any combination of digital hidrosis factors and/or activity log parameters, as well as any defined normal ranges for those digital hidrosis factors and/or activity log parameters.

Absent any administrator-defined parameters, the digital hidrosis engine 140 will continue to collect and normalize data using well-known machine learning techniques to develop a continuous monitoring capability and dynamic definition of normal user and system behavior.

If a deviation report 160 is sent to the digital hidrosis engine 140, it can be used to trigger any type of appropriate response. Such responses can include, but are not limited to: (1) launching a subject or host based investigation to determine the level of risk; (2) placing the host on a quarantine network to reduce the exposure of other network assets; and (3) placing the host on a honeypot network to determine the intent of the malicious activity or increase the cost of compromise for the attacker.

At predetermined intervals set by an administrator, the digital hidrosis monitor 110 in each host system 120 compiles the HDHD and ALP into a host data map 170 and sends the host data map 170 to the digital hidrosis engine 130 on the server 140. The HDHD can be either a single snapshot of HDHD at the time of transmission to the server 140 or it can be a cumulative compilation of multiple HDHD snapshots since the last transmission to the server 140, depending on the specific digital hidrosis factor. For example, it may be that for one or more of the digital hidrosis factors (e.g., system settings, hygiene) a snapshot of the HDHD values for those factors at the time of transmission to the server 140 would be sufficient, but for the rest of the digital hidrosis factors a cumulative compilation of multiple HDHD snapshots since the last transmission is preferable.

The host data map 170 is preferably an aggregation of HDHD and ALP into a manageable format that summarizes the values of all the digital hidrosis factors and activity log parameters being monitored by the digital hidrosis monitor 110. The digital hidrosis factors are preferably converted to numerical values that include calculated individual factor score(s) as well as frequency counts (when appropriate) and preferably recorded in a matrix for efficient storage, transmission to the server 140, and analysis. The non-binary representation of the HDHD is best thought of as a heatmap with deviations determined by overlaying the collected HDHD over the server defined normalized RDHD and looking for deviations or mismatches. Additionally, the collected HDHD can also be compared against a stored set of known malicious or anomalous activity RDHD sets.

The digital hidrosis engine 130 receives host data maps 170 from all host systems 120 and evaluates them to normalize the data and determine if any anomalies have been detected amongst the host systems 120. The digital hidrosis engine preferably utilizes well-known machine learning principles to normalize the data and determine patterns of abnormal or potentially malicious activity. The digital hidrosis engine compiles a new reference data map containing updated RDHD and preferably updated RALP that define "normal" behavior and sends the new reference data map 150 to the host systems 120, which the host systems 120 then use as the new reference with which to compare HDHD and ALP.

The reference data map 150 created by the digital hidrosis engine 130 can include a reference data map 150 that defines "normal" behavior based on the activities of the entire enterprise (all employees/users), as well as a reference data map 150 that defines "normal" behavior based on the activities of a predetermined group (e.g., users that are engineers, users that are accountants, users that are in management, etc.). Further, an administrator can apply different weights to the individual hidrosis factors that make up the reference data map 150 based on organizational preferences. The weighting can be done on a permanent basis or can be scheduled for start and expiration based on anticipated or real-time events (e.g., a major terrorist attack changes user behavior because they all check the news to see what happened).

The reference data map 150 can also be shared through a centralized cloud server 190 with other organizations. Additional data analytics can be applied to the RDHD via a cloud digital hidrosis engine 195 in order to normalize the data over very large scales (several organizations). These normalized RDHD sets can be categorized by user role, company sector, company size, and other factors to produce generalized RDHD that can be shared back to the individual digital hidrosis engines 130.

If a HDHD set triggers a deviation report 160 and a subsequent subject-based investigation confirms that malicious or anomalous behavior occurred, that HDHD set can be stored as a known "malicious" RDHD signature against which other HDHD sets can be compared. The RDHD sets identified as malicious activity (malicious RDHD sets) can also be shared with the cloud digital hidrosis engine 195 and distributed out to other individual digital hidrosis engines 130, preferably in a subscription format, with an administrator determining which RDHD known malicious templates to subscribe to. In this way, the malicious RDHD sets can be shared with other organizations.

All RDHDs transmitted to and from the cloud digital hidrosis engine 195 are preferably anonymized for privacy purposes. The cloud RDHD sets can also be used as the initial baseline for a new installation at an administrator's discretion.

Figure 2:
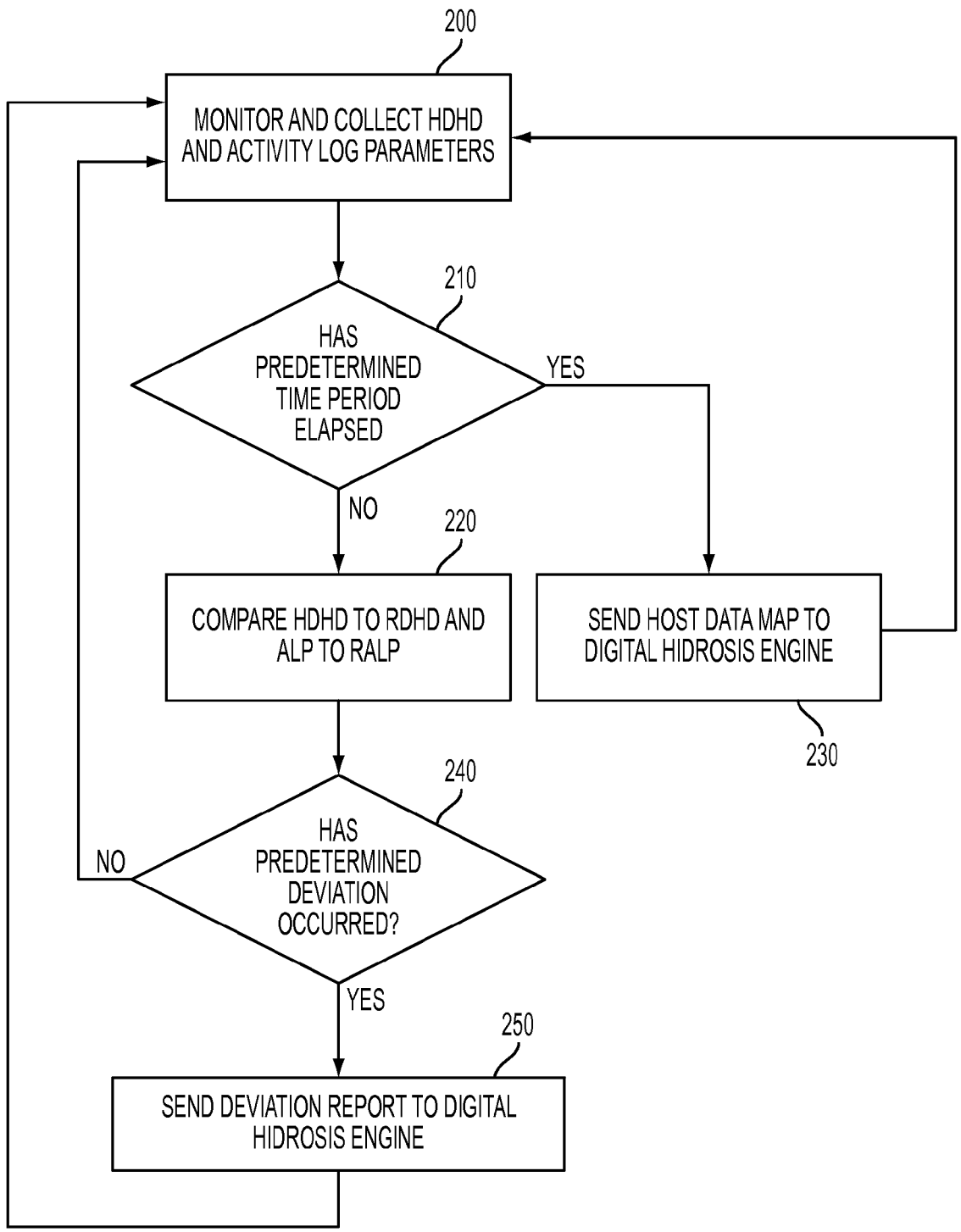
FIG. 2 is a flowchart illustrating steps in the operation of the digital hidrosis monitor 110, in accordance with one preferred embodiment of the present invention.

FIG. 2 is a flowchart illustrating steps in the operation of the digital hidrosis monitor 110, in accordance with one preferred embodiment of the present invention. The process starts at step 200, where the digital hidrosis monitor 110 collects and monitors HDHD and RALP. Then, at step 210, the digital hidrosis monitor 110 determines if a predetermined time period has elapsed. If not, the process proceeds to step 220, where the collected HDHD is compared to the current RDHD and the collected ALP is compared to the current RALP. If the time predetermined time period has elapsed, the process skips to step 230, where the digital hidrosis monitor 110 sends a host data map to the digital hidrosis engine 130, and the process goes back to step 200.

Once the comparison of step 220 is completed, the process proceeds to step 240, where the digital hidrosis monitor 110 determines if a predetermined deviation has occurred as a result of the comparison step 220 or if the HDHD matches a known malicious behavioral pattern. If so, the process proceeds to step 250, where the digital hidrosis monitor 110 sends a deviation report 160 to the digital hidrosis engine 130. If not, then the process loops back to step 200.

Figure 3:
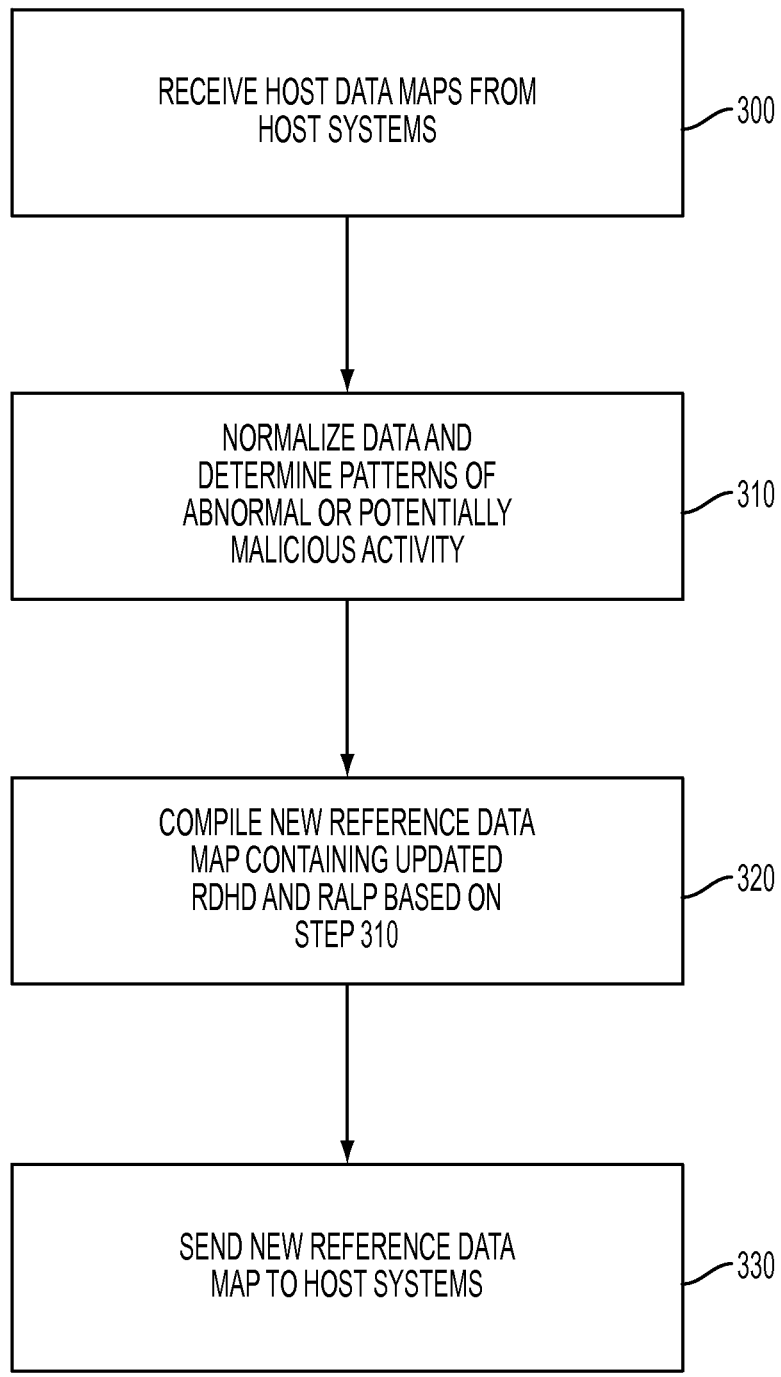
FIG. 3 is a flowchart illustrating steps in the operation of the digital hidrosis engine 130, in accordance with one preferred embodiment of the present invention.

FIG. 3 is a flowchart illustrating steps in the operation of the digital hidrosis engine 130, in accordance with one preferred embodiment of the present invention. The process starts at step 300, where the digital hidrosis engine 130 receives a host data map 170 from a host system 120. Then, at step 310, the digital hidrosis engine 130 normalizes the data in the host data map 170 and determines patterns of abnormal activity or potentially malicious activity.

At step 320, the digital hidrosis engine 130 compiles a new reference data map containing updated RDHD and RALP based on the normalization performed in step 310. The new reference data map 150 is then sent to the host system 120 at step 330.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A method for monitoring a data network and identifying potentially malicious or threatening cyber activity, comprising:
   monitoring and collecting digital hidrosis data from at least one host system, wherein the digital hidrosis data comprises data associated with predetermined system and user-based behavioral indicators that provide information regarding a user's behavior, wherein the predetermined system and user-based behavioral indicators comprise at least one indicator that is not associated with autonomous application-initiated activity;
   comparing the digital hidrosis data with reference digital hidrosis data, wherein the reference digital hidrosis data defines normal values and/or a normal range of values for the predetermined system and user-based behavioral indicators that are indicative of non-malicious activity by a user; and determining whether malicious or threatening cyber activity may be present based on the comparison between the digital hidrosis data and the reference digital hidrosis data.

2. The method of claim 1, wherein a determination is made that malicious or threatening cyber activity may be present when a predetermined number and predetermined combination of system and user-based behavioral indicators exceed the normal values and/or normal range of values defined by the reference digital hidrosis data.

3. The method of claim 1, further comprising generating a deviation report when it is determined that malicious or threatening cyber activity may be present.

4. The method of claim 1, further comprising periodically defining new reference digital hidrosis data based on the digital hidrosis data collected by the at least one host system.

5. The method of claim 1, wherein the predetermined system and user-based behavioral indicators comprise at least one of the following:
 (a) whether an anomalous or unknown code has gained execution privileges on the at least one host system;
 (b) CPU utilization in the at least one host system;
 (c) activities exhibited by one or more applications running on the at least one host system that are associated with a user interfacing with the one or more applications;
 (d) timing of external connections made by the at least one host system;
 (e) performance of user interfaces used by the at least one host system;
 (f) the length of network sessions initiated by the at least one host system;
 (g) network activity initiated by a user;
 (h) system settings on the at least one host system;
 (i) hygiene profile of the at least one host system; and
 (j) data acquisition history of the at least one host system.

6. The method of claim 1, wherein the at least one indicator that is not associated with autonomous application-initiated activity comprises at least one of the following:
 (a) activities exhibited by one or more applications running on the at least one host system that are associated with a user interfacing with the one or more applications;
 (b) timing of external connections made by the at least one host system;
 (c) performance of user interfaces used by the at least one host system;
 (d) the length of network sessions initiated by the at least one host system;
 (e) network activity initiated by a user;
 (f) system settings on the at least one host system; and
 (g) data acquisition history of the at least one host system.

7. A system for monitoring a data network and identifying potentially malicious or threatening cyber activity, comprising:
 at least one host system, wherein each host system comprises a host processor and host memory; and
 a digital hidrosis monitor comprising a set of computer readable instructions stored in each host memory that are executable by each host processor to:
  monitor and collect digital hidrosis data from the host system, wherein the digital hidrosis data comprises data associated with predetermined system and user-based behavioral indicators that provide information regarding a user's behavior, wherein the predetermined system and user-based behavioral indicators comprise at least one indicator that is not associated with autonomous application-initiated activity,
  compare the digital hidrosis data with reference digital hidrosis data stored in the memory, wherein the reference digital hidrosis data defines normal values and/or a normal range of values for the predetermined system and user-based behavioral indicators that are indicative of non-malicious activity by a user, and
  determine whether malicious or threatening cyber activity may be present based on the comparison between the digital hidrosis data and the reference digital hidrosis data.

8. The system of claim 7, wherein the host processor determines that malicious or threatening cyber activity may be present when a predetermined number and predetermined combination of system and user-based behavioral indicators exceed the normal values and/or normal range of values defined by the reference digital hidrosis data.

9. The system of claim 7, wherein the at least one indicator that is not associated with autonomous application-initiated activity comprises at least one of the following:
 (a) activities exhibited by one or more applications running on the at least one host system that are associated with a user interfacing with the one or more applications;
 (b) timing of external connections made by the at least one host system;
 (c) performance of user interfaces used by the at least one host system;
 (d) the length of network sessions initiated by the at least one host system;
 (e) network activity initiated by a user;
 (f) system settings on the at least one host system; and
 (g) data acquisition history of the at least one host system.

10. The system of claim 7, wherein the predetermined system and user behavioral factors comprise at least one of the following:
 (a) whether an anomalous or unknown code has gained execution privileges on the at least one host system;
 (b) CPU utilization in the at least one host system;
 (c) activities exhibited by one or more applications running on the at least one host system that are associated with a user interfacing with the one or more applications;
 (d) timing of external connections made by the at least one host system;
 (e) performance of user interfaces used by the at least one host system;
 (f) the length of network sessions initiated by the at least one host system;
 (g) network activity initiated by a user;
 (h) system settings on the at least one host system;
 (i) hygiene profile of the at least one host system; and
 (j) data acquisition history of the at least one host system.

11. The system of claim 7, further comprising:
 a server comprising a server processor and a server memory;
 a digital hidrosis engine comprising a set of computer readable instructions stored in the server memory that are executable by the server processor to:
  receive digital hidrosis data collected and sent by each host system,
  create new reference digital hidrosis data based on the received digital hidrosis data, and
  send the new reference digital hidrosis data to each host system.

12. The system of claim 11, wherein each host processor generates a deviation report and sends the deviation report to the server when the host processor determines that malicious or threatening cyber activity may be present.

13. A system for monitoring a data network and identifying potentially malicious or threatening cyber activity, comprising:

at least one digital hidrosis monitor, wherein each digital hidrosis monitor:
monitors and collects digital hidrosis data from a respective host system, wherein the digital hidrosis data comprises data associated with predetermined system and user-based behavioral indicators that provide information regarding a user's behavior, wherein the predetermined system and user behavioral factors user-based behavioral indicators comprise at least one indicator that is not associated with autonomous application-initiated activity,
compares the digital hidrosis data with reference digital hidrosis data, wherein the reference digital hidrosis data defines normal values and/or a normal range of values for the predetermined system and user-based behavioral indicators that are indicative of non-malicious activity by a user, and
determines whether malicious or threatening cyber activity may be present based on the comparison between the digital hidrosis data and the reference digital hidrosis data.

14. The system of claim 13, wherein each digital hidrosis monitor determines that malicious or threatening cyber activity may be present when a predetermined number and predetermined combination of system and user behavioral factors user-based behavioral indicators exceed the normal values and/or normal range of values defined by the reference digital hidrosis data.

15. The system of claim 13, wherein the at least one indicator that is not associated with autonomous application-initiated activity comprises at least one of the following:
(a) activities exhibited by one or more applications running on the at least one host system that are associated with a user interfacing with the one or more applications;
(b) timing of external connections made by the at least one host system;
(c) performance of user interfaces used by the at least one host system;
(d) the length of network sessions initiated by the at least one host system;
(e) network activity initiated by a user;
(f) system settings on the at least one host system; and
(g) data acquisition history of the at least one host system.

16. The system of claim 13, wherein the predetermined system and user-based behavioral indicators comprise at least one of the following:
(a) whether an anomalous or unknown code has gained execution privileges on the at least one host system;
(b) CPU utilization in the at least one host system;
(c) activities exhibited by one or more applications running on the at least one host system that are associated with a user interfacing with the one or more applications;
(d) timing of external connections made by the at least one host system;
(e) performance of user interfaces used by the at least one host system;
(f) the length of network sessions initiated by the at least one host system;
(g) network activity initiated by a user;
(h) system settings on the at least one host system;
(i) hygiene profile of the at least one host system; and
(j) data acquisition history of the at least one host system.

17. The system of claim 13, further comprising:
a digital hidrosis engine, wherein the digital hidrosis engine:
receives digital hidrosis data collected and sent by each digital hidrosis monitor,
creates new reference digital hidrosis data based on the received digital hidrosis data, and
sends the new reference digital hidrosis data to each digital hidrosis monitor.

18. The system of claim 17, wherein each digital hidrosis monitor generates a deviation report and sends the deviation report to the digital hidrosis engine when the digital hidrosis monitor determines that malicious or threatening cyber activity may be present.

* * * * *